251-62 SR
4/7/87 XR RE 32,390

United States Patent [19]
Pringle

[11] E Patent Number: Re. 32,390
[45] Reissued Date of Patent: Apr. 7, 1987

[54] HYDRAULIC ACTUATING MEANS FOR SUBSURFACE SAFETY VALVE

[75] Inventor: Ronald E. Pringle, Houston, Tex.

[73] Assignee: Camco, Incorporated, Houston, Tex.

[21] Appl. No.: 782,783

[22] Filed: Oct. 2, 1985

Related U.S. Patent Documents

Reissue of:
[64] Patent No.: 4,527,630
Issued: Jul. 9, 1985
Appl. No.: 538,000
Filed: Sep. 30, 1983

U.S. Applications:
[63] Continuation-in-part of Ser. No. 383,897, Jun. 1, 1982, abandoned.

[51] Int. Cl.[4] ..... E21B 43/12
[52] U.S. Cl. ..... 166/321; 166/332; 251/62
[58] Field of Search ..... 166/319, 321-324, 166/332, 375, 72; 251/62, 63, 63.5

[56] References Cited

U.S. PATENT DOCUMENTS

| | | | |
|---|---|---|---|
| 2,862,775 | 12/1958 | Kupiec | 92/246 |
| 4,049,052 | 9/1977 | Arendt | 166/183 |
| 4,119,146 | 10/1978 | Taylor | 166/321 |
| 4,161,219 | 7/1979 | Pringle | 166/324 |
| 4,215,748 | 8/1980 | Pace et al. | 166/322 |
| 4,252,197 | 2/1981 | Pringle | 166/72 |
| 4,452,310 | 6/1984 | Pringle et al. | 166/319 |
| 4,503,913 | 3/1985 | Carmody | 166/319 |

*Primary Examiner*—James A. Leppink
*Assistant Examiner*—Hoang C. Dang
*Attorney, Agent, or Firm*—Fulbright & Jaworski

[57] ABSTRACT

The improvement in a hydraulic actuator for actuating a subsurface safety valve having a metal piston connected to and actuating the valve and movable in a cylinder in which the cylinder is connected at one end to a hydraulic control fluid passageway and on the second end to pressure in the safety valve. The cylinder includes metal valve seats and metal valve elements are connected to the piston for seating on the valve seats for providing positive seals. A universal connection may be provided between the pistons and the valve elements. The piston seal may be opposing metal cups or a labyrinth seal.

17 Claims, 5 Drawing Figures

32
32
13
46
50
10
48
15
12
40
52
22
14
42
26
16
20
24
18

54
50
58
40
48
60
52
56

49
60b
48b
40b
58b
54b
50b
56b
52b

HYDRAULIC ACTUATING MEANS FOR SUBSURFACE SAFETY VALVE

Matter enclosed in heavy brackets [ ] appears in the original patent but forms no part of this reissue specification; matter printed in italics indicates the additions made by reissue.

CROSS-REFERENCE TO RELATED APPLICATION

The present application is a continuation-in-part of copending patent application Ser. No. 06/383,897, filed June 1, 1982, entitled Hydraulic Actuating Means for Subsurface Safety Valve now abandoned.

BACKGROUND OF THE INVENTION

It is well known to utilize an elastomer seal in a hydraulic piston and cylinder assembly in a safety valve such as shown in U.S. Pat. Nos. 4,161,219 and 4,049,052. However, elastomer seals are limited as to the temperatures in which they can operate, the pressures which they can withstand, the corrosive environment in which they can operate, and the length of time before they must be replaced. Copending patent application Ser. No. 322,318 entitled Metal to Metal High/Low Pressure Seal, filed Nov. 17, 1981, discloses a metal-to-metal seal used in a piston and cylinder actuating assembly in a subsurface safety valve. However, it is difficult to manufacture metal-to-metal seals which will seal under all pressure conditions and which will seal against gases.

The present invention is directed to a hydraulic actuating means for actuating a subsurface well safety valve which avoids the use of elastomer seals and can be used in both high and low pressure and high and low temperature applications and in the presence of corrosive fluids and gases.

SUMMARY

The present invention is directed to a subsurface well safety valve for controlling fluid flow through a well conduit which includes a housing and a valve closure member moving between open and closed positions by providing an improved hydraulic actuating means for actuating the valve closure member. At least one cylinder is provided in the housing with a metal piston movable in each cylinder. The piston is connected to and moves the valve closure member. The cylinder on one side of the piston is in communication with a hydraulic control fluid passageway and the cylinder on the second side of the piston is in communication with fluid pressure in the valve housing. The cylinder includes first and second spaced metal valve seats. First and second metal valve elements are connected to the piston. The first and second metal valve elements are spaced from each other to alternately seat and unseat on the first and second valve seats, respectively, as the piston alternately moves in the cylinder. The metal valve elements provide a positive seal for sealing off the hydraulic actuating means even if fluid leaks by the piston.

A still further object of the present invention is wherein the piston includes a metal seal for sealing against the cylinder.

A further object is wherein the piston includes opposing metal cups engaging the cylinder.

Another object is wherein the piston includes a labyrinth seal.

Still a further object of the present invention is the provision of a universal connection between the piston and said valve elements for allowing the piston to align itself properly with the cylinder.

Still a further object is wherein the first and second valve seats are on opposite sides of the piston and the first and second valve elements are connected to opposing sides of the piston. Preferably, the valve seats and valve elements are positioned whereby the first element is adapted to seat on the second seat when the piston moves away from the second seat.

Another object is the provision of another embodiment in which the first and second valve seats are positioned on one side of the piston and the first and second valve elements are connected to said one side of the piston.

Yet a still further object of the present invention is the provision of a tubing well safety valve for controlling the fluid flow through a well tubing and including a housing having an axial bore and a valve closure member moving in the housing between open and closed positions for controlling fluid flow through the bore. A longitudinally tubular member is telescopically movable in the housing coaxially with the bore for controlling the movement of the valve closure member by providing an improved hydraulic actuating means for actuating the tubular member. A generally longitudinally extending cylinder is in the housing with the upper end of the cylinder in communication with a hydraulic control fluid passageway, and the lower end of the cylinder is in communication with the pressure in the axial bore of the safety valve. A metal piston is movable in the cylinder in response to fluid movement through the cylinder acting on the piston and the piston is connected to and moving the tubular member. The cylinder includes an upper metal valve seat at the upper end of the cylinder and includes a lower metal valve seat at the lower end of the cylinder. An upper metal valve element is connected to the piston and positioned above the upper valve seat and is adapted to seat on the upper valve seat when the piston moves downwardly away from the upper valve seat. A lower metal valve element is connected to the piston and is positioned below the lower valve seat and is adapted to seat on the lower valve seat when the piston moves upwardly away from the lower valve seat.

Other and further objects, features and advantages will be apparent from the following description of presently preferred embodiments of the invention, given for the purpose of disclosure and taken in conjunction with the accompanying drawings.

DESCRIPTION OF THE PREFERRED EMBODIMENT

While the present invention will be described in connection with a subsurface tubing safety valve having a flapper type valve closure member, it is understood that the present invention may be used with other types of safety valves and other valve closure members.

Figure 1:
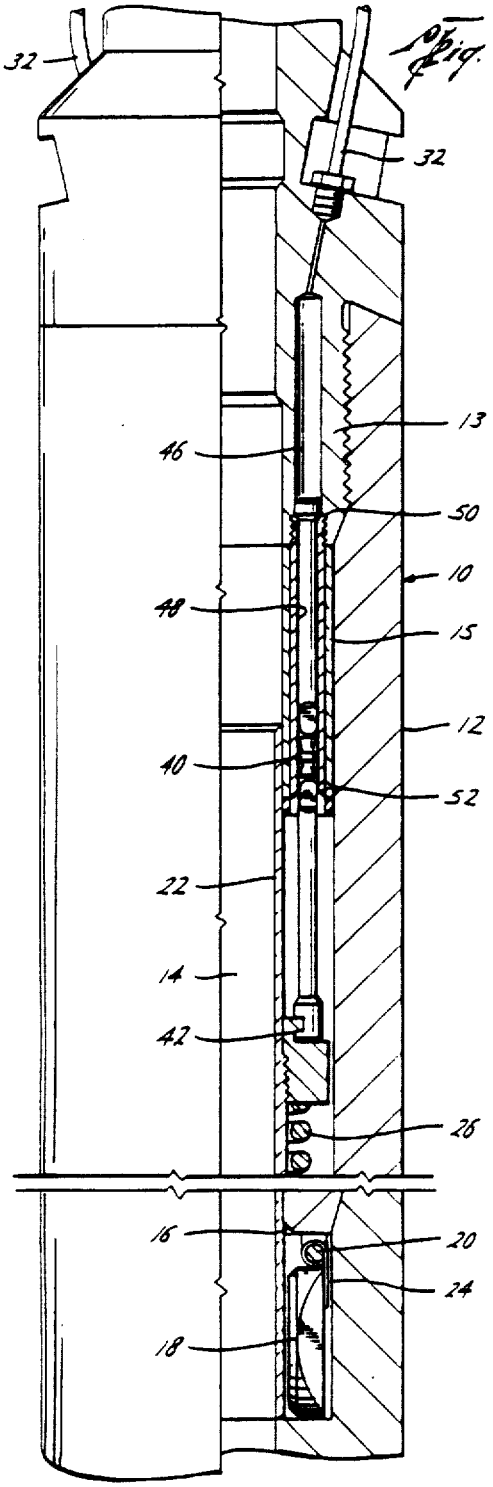
FIG. 1 is an elevational view, in quarter section, of a well safety valve utilizing the present invention and shown in the open position.

Referring now to the drawings, particularly to FIG. 1, the reference numeral 10 generally indicates a subsurface tubing safety valve of the present invention which includes a body or housing 12 which is adapted to be connected in a well tubing to permit well production therethrough under normal operating conditions, but in which the safety valve 10 may close or be closed in response to abnormal conditions.

The valve 10 includes a bore 14, an annular valve seat 16 positioned about the bore 14, a valve closure element such as a flapper valve 18 connected to the body 12 by pivot pin 20. Thus, when the flapper valve 18 is in the upward position and seated on the valve seat 16, the safety valve 10 is closed blocking flow upwardly through the bore 14 and well tubing.

A sliding tube or longitudinal tubular member 22 is telescopically movable in the body 12 and through the valve seat 16. As best seen in FIG. 1, when the tubular member 22 is moved to a downward position, the tube 22 pushes the flapper 18 away from the valve seat 16. Thus, the valve 10 is held in the open position so long as the tube 22 is in the downward position. When the tube is moved upwardly, the flapper 18 is allowed to move upwardly onto the seat 16 by the action of a spring 24 and also by the action of fluid flow moving upwardly through the bore 14 and behind the flapper 18.

The tubular member 22 is biased in an upward direction by a suitable means which may include a spring 26 for yieldably urging the member 22 in an upward direction to release the flapper 18 for closing the valve 10. The safety valve 10 is controlled by the application or removal of a pressurized fluid, such as hydraulic fluid, through a control path or line, such as one or more control lines 32 extending to the well surface or the casing annulus, which supplies pressurized fluid to the top of one or more pistons 40 which in turn act on the tubular member 22 to move the tubular member 22 downwardly forcing the flapper 18 off of the seat 16 and into the full open position. The piston 40 may be an annular piston or may be a plurality of circular pistons 40, such as two, positioned in the housing 12 and connected to the tubular member 22 by a connection 42. The safety valve 10 is controlled by the application or removal of pressurized fluid through the control lines 32 and a fluid passageway 46 to supply hydraulic control pressurized fluid to the cylinder 48 and the top of the piston 40. The bottom of the piston 40 is exposed to fluid pressure in the bore 14 which acts against the bottom of the piston 40 for biasing the tubular member 22 to the closed position when fluid control pressure is removed from the control line 32.

The above description is generally disclosed in patent application Ser. No. 322,318 described above. However, the prior art, which has utilized a metal piston 40, such as in the form of cup seals, is difficult to manufacture to obtain desirable sealing under all pressure conditions and particularly in sealing gases. Furthermore, in some applications, the metal piston 40 is subject to wear and tear in its hostile environment and may leak. The present invention is directed to providing positive valve element seals connected to the piston 40 which will provide a positive seal in both directions for the double acting piston 40. And the seals will provide a working hydraulic actuator even in the event that the piston 40 deteriorates to a condition which allows a considerable fluid bypass between the piston 40 and cylinder 48.

Figure 2:
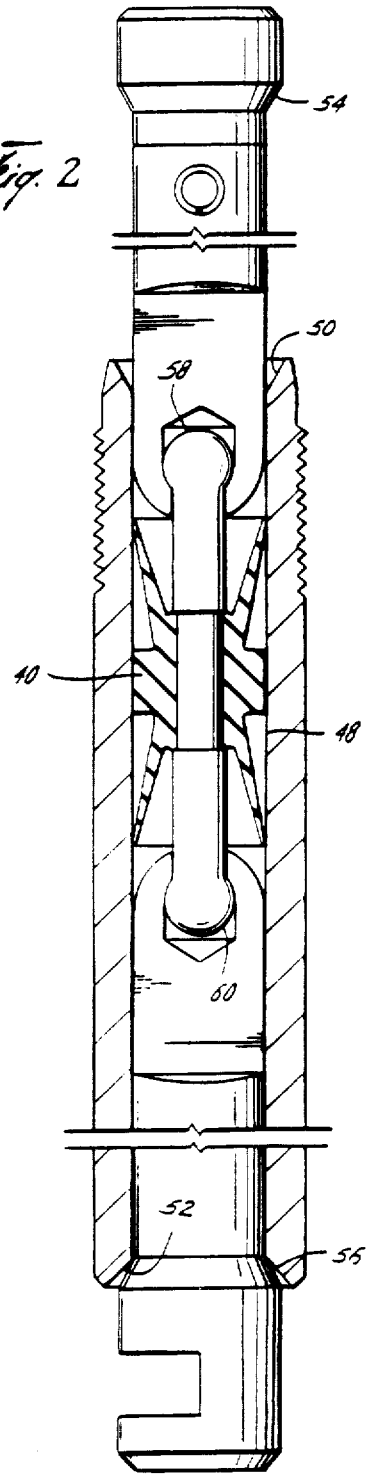
FIG. 2 is an enlarged cross-sectional view of the hydraulic actuating means of FIG. 1 with the hydraulic piston being in its full upward position.

Referring now to FIG. 2, the cylinder 48 includes a first metal valve seat 50 on one side of the piston 40 and in communication with the fluid control passageway 46 whereby hydraulic control fluid can flow to and actuate the top of the piston 40 through the valve seat 50. A second metal valve seat 52 is provided on the cylinder 48 on the second side of the piston 40 through which fluid pressure in the safety valve and tubing can flow to the bottom side of and actuate the piston 40. A first metal valve element 54 is provided connected to the first side of the piston 40 and is adapted to seat on the first valve seat 50 to provide a positive seal when the piston 40 moves away from the first valve seat 50 (FIG. 1). A second metal valve elements 56 is connected to the second side of the piston 40 and is adapted to seat on the second valve seat 52 and provide a positive seal when the piston 40 moves away from the second valve seat 52 (FIG. 2). Preferably, the valve element 54 and 56 are connected to the piston 40 by a ball and socket universal connection 58 and 60, respectively, for allowing the piston 40 to align itself properly in the cylinder 48 without binding. The piston 40 merely provides a dynamic seal in the cylinder 48 sufficient to cause movement of the piston 40 in the cylinder 48 to actuate the sliding tube 22. The valve elements 54 and 56 provide a static and positive seal when they are seated on their respective valve seats 50 and 52. Therefore, with the use of the positive valve elements 54 and 56 leakage of fluids past the piston 40 will not cause the hydraulic actuating system to become inoperative so long as the piston 40 seals sufficiently in the cylinder 48 to move the valve elements 54 and 56 to their seated positions. Once the valve elements 54 and 56 are in the seated position, fluid pressure acting on the back side of the elements 54 and 56 will positively seat and keep the valve elements 54 and 56 seated. The piston 40 may be in the form 41 shown in FIG. 3A which is a conventional turbulent or labyrinth seal which has a minimum of sealing action. In fact the piston 40 could be merely a smooth elongated rod with a sufficiently close fit in the cylinder 48 whereby the pressure drop acting across the piston would move the valve elements 54 and 56 into their seated position.

Figure 3:
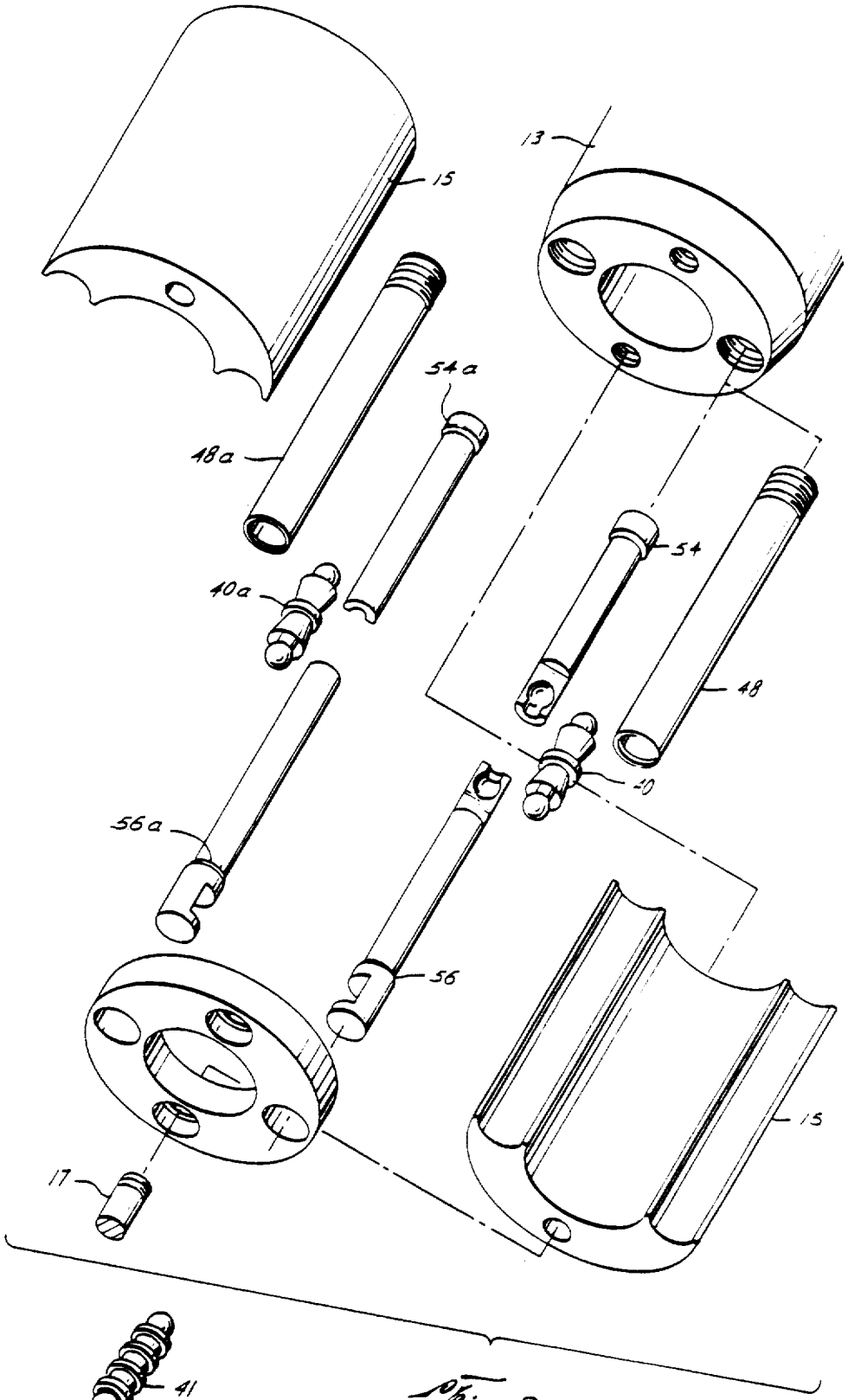
FIG. 3 is an exploded perspective view of the hydraulic actuating means of the present invention.
Figure 3A:
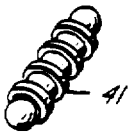
FIG. 3A is a modified type of piston.

Referring to FIG. 3, an exploded perspective view of two hydraulic piston and cylinder actuators are shown which are identical and wherein the numbers of the second actuating means utilize the suffix "a" to correspond to like parts. Thus, the cylinders 48 and 48a are threadably secured at their upper ends to a housing member 13 and are enclosed by semi-circular housing members 15, which are secured to member 13 by suitable bolts 17.

In operation, when hydraulic control fluid is supplied through the line 32 fluid will flow into the passageway 46 and into the cylinder 48 above the piston 40 moving the piston 40 downwardly which in turn carries the sliding tube 22 downwardly to open the flapper 18. Downward movement of the piston 40 carries the valve element 54 downwardly until it contacts and seats on valve seat 50 (FIG. 1) to provide a positive seal and further fluid pressure in the fluid passageway 46 acts on the back of the valve element 54 to hold it in the sealed position. When it is desired to close the valve, the pressure in the hydraulic control line 32 is reduced thereby reducing the pressure in the hydraulic passageway 46 and on the top of the valve element 54. The fluid pressure in the bore 14 of the safety valve 10 is in communication with the cylinder 48 and the bottom of the piston 40 and along with the spring 26 biases the piston 40 in an upward direction until, as best seen in FIG. 2, the valve element 56 is seated on the valve seat 52 to provide a positive seal in the upward direction. Thereafter, the fluid pressure in the well tubing and bore 14 acts on the back of the valve element 56 to maintain it in a sealed position on the valve seat 52.

Figure 4:
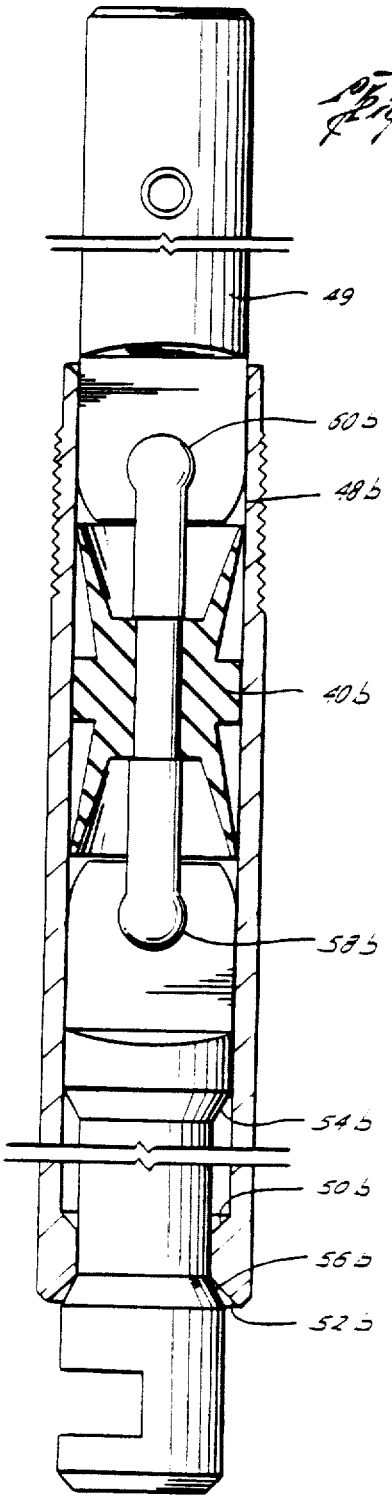
FIG. 4 is an enlarged cross-sectional view of another embodiment of a hydraulic actuating means.

Other and further embodiments of a hydraulic actuating means may be provided utilizing a metal piston movable in a cylinder and connected to the valve closure member. Spaced metal valve seats in the cylinder and metal valve elements connected to the piston which will provide a positive seal in both directions for the double acting piston. This avoids the use of elastomer seals and can be utilized in both high and low pressure and high and low temperature applications. Referring now to FIG. 4, another embodiment of the present invention is shown in which like parts to those in FIG. 2 are similarly numbered with the suffix "b". Referring now to FIG. 4, the cylinder 48b includes a first metal valve seat 50b on one side of the piston 40b. A second metal valve seat 52b is provided on the cylinder 48 on the same side of the piston 40b as the valve seat 50b. A first metal valve element 54b is provided connected to said one side of the piston 40b and is adapted to set on the first valve seat 50b to provide a positive seal when the piston 40b moves downwardly and towards the first valve seat 50b. A second metal valve element 56b is connected to said one side of the piston 40b and is adapted to seat on the second valve seat 52b and provide a positive seal when the piston 40b moves upwardly and away from the second valve seat 52b. Preferably, the valve elements 54b and 56b are connected to the piston 40b by a ball and socket universal connection 58b. In addition, a centralizer 49 may be provided connected by a ball and socket universal connection 60b on the second side of the piston 40b for aligning the piston 40b in the cylinder 48b. As in the prior embodiment, the piston 40b merely provides a dynamic seal in the cylinder 48b sufficient to cause movement of the piston 40b in the cylinder 48b to actuate the sliding tube 22. The valve elements 54b and 56b provide static and positive seals when they are seated on the respective valve seats 50b and 52b. Once the valve element 54b or 56b are in the seated position, the fluid pressure acting on the back side of the elements 54b and 56b will positively seat and keep the valve elements 54b and 56b seated. Again, the piston 40b may be of the opposing metal cup type or a labyrinth seal 41 shown in FIG. 3A or even a smooth elongated rod having a sufficiently close fit in the cylinder 48b to provide a pressure drop sufficient to move the valve elements 54b and 56b into their seated position. The operation of the hydraulic actuating mechanism of FIG. 4 is similar to that described in connection with the operation of the actuator in FIGS. 1-3.

The present invention, therefore, is well adapted to carry out the objects and attain the ends and advantages mentioned as well as others inherent therein. While presently preferred embodiments of the invention are given for the purpose of disclosure, numerous changes in the details of construction and arrangement of parts, will readily suggest themselves to those skilled in the art and which are encompassed within the spirit of the invention and the scope of the appended claims.

What is claimed is:

1. In a well safety valve for controlling the fluid flow through a well conduit and including a housing and a valve closure member moving between open and closed positions, a longitudinal tubular member telescopically movable in the housing for controlling the movement of the valve closure element, the improvement in hydraulic actuating means for actuating the valve closure member comprising, a cylinder in the housing, a metal piston movable in the cylinder in response to fluid acting on the piston, said piston connected to and moving the tubular member, said cylinder on one side of the piston in communication with a hydraulic control fluid passageway, and said cylinder on the second side of the piston in communication with pressure in the safety valve, said cylinder including first and second spaced metal valve seats, and first and second metal valve elements connected to the piston, said first and second elements spaced from each other to alternately seat and unseat on the first and second valve seats, respectively, as the piston alternately moves in the cylinder.

2. The apparatus of claim 1 wherein the first and second valve seats are on opposite sides of the piston and the first and second valve elements are connected to opposite sides of the piston.

3. The apparatus of claim 1 where in the valve seats and valve elements are positioned whereby the first element is adapted to seat on the first seat when the piston moves away from the first seat, and the second element is adapted to seat on the second seat when the piston moves away from the second seat.

4. The apparatus of claim 1 wherein the first and second valve seats are positioned on one side of the piston and the first and second valve elements are connected to said one side of the piston.

5. The apparatus of claim 1 wherein the piston includes opposing metal cups engaging said cylinder.

6. The apparatus of claim 1 wherein the piston includes a labyrinth seal.

7. The apparatus of claim 1 including, a universal connection between the first and second sides of the piston and said valve elements.

8. In a well subsurface safety valve for controlling the fluid flow through a well conduit and including a tubular housing having an axial bore therethrough and a valve closure member moving between open and closed positions for controlling the fluid flow through the bore, a longitudinal tubular member telescopically moving in the housing coaxially with the bore for controlling the movement of the valve closure member, the improvement in hydraulic actuating means for actuating the valve closure member comprising, a generally longitudinally extending cylinder in the housing, said cylinder having its upper end in communication with a hydraulic control fluid passageway, and said cylinder having its lower end in communication with the pressure in the axial bore of the safety valve, a metal piston movable in the cylinder in response to fluid movement through the cylinder acting on and moving said piston, said piston connected to and moving said tubular member, said cylinder including an upper metal valve seat at the upper end of the cylinder and including a lower metal valve seat at the lower end of the cylinder, an upper metal valve element connected to the piston and positioned above the upper valve seat and adapted to seat on the upper valve seat when the piston moves downwardly away from the upper valve seat, and a lower metal valve element connected to the piston and positioned below the lower valve seat and adapted to seat on the lower valve seat when the piston moves upwardly away from the lower valve seat.

9. The apparatus of claim 8 wherein said piston includes opposing metal cups engaging said cylinder.

10. The apparatus of claim 8 wherein said piston includes a labyrinth seal.

11. The apparatus of claim 8 including, a universal connection between the first and second sides of the piston and said valve elements.

12. In a well subsurface safety valve for controlling the fluid flow through a well conduit and including a tubular housing having an axial bore therethrough and a valve closure member moving between open and closed positions for controlling the fluid flow through the bore, a longitudinal tubular member telescopically moving in the housing coaxially with the bore for controlling the movement of the valve closure member, the improvement in hydraulic actuating means for actuating the valve closure member comprising, a generally longitudinally extending cylinder in the housing, said cylinder having its upper end in communication with a hydraulic control fluid passageway, and said cylinder having its lower end in communication with the pressure in the axial bore of the safety valve, a metal piston movable in the cylinder in response to fluid movement through the cylinder acting on and moving said piston, said piston connected to and moving said tubular member, said cylinder including a first metal valve seat and a second metal valve seat on one side of the piston, a first metal valve element connected to one side of the piston adapted to seat on the first valve seat when the piston moves away from the first valve seat, and a second metal valve element connected to the one side of the piston and adapted to seat on the second valve seat when the piston moves towards the second valve seat.

13. The apparatus of claim 12 wherein said piston includes opposing metal cups engaging said cylinder.

14. The apparatus of claim 12 wherein the piston includes a labyrinth seal.

15. The apparatus of claim 12 including, a universal connection between the piston and said valve elements.

*16. In a well safety valve for controlling the fluid flow through a well conduit and including a housing and a valve closure member moving between open and closed positions, a longitudinal tubular member telescopically movable in the housing for controlling the movement of the valve closure element, the improvement in a hydraulic actuating means for actuating the valve closure member comprising,*

*a cylinder in the housing,*

*a piston movable in the cylinder in response to fluid acting on the piston, said piston contacting and moving the tubular member,*

*said cylinder on one side of the piston in communication with a hydraulic control fluid passageway, and said cylinder on the second side of the piston in communication with pressure in a safety valve,*

*said cylinder including first and second spaced metal valve seats, and*

*first and second metal valve elements connected to the piston, said first and second elements spaced from each other to alternately seat and unseat on the first and second valve seats, respectively, as the piston alternately moves in the cylinder.*

*17. In a subsurface well safety valve for controlling the fluid flow through a well conduit and including a housing having a bore and a valve closure member moving between open and closed positions for controlling the fluid flow through the bore, a tubular member telescopically moving in the housing for controlling the movement of the valve closure member, and biasing means for moving the tubular member in a direction to close the valve, the improvement in fluid actuating means for actuating the valve closure member comprising,*

*a cylinder in the housing,*

*a piston in and movable relative to the cylinder in response to fluid pressure in the cylinder, one of said cylinder and piston engaging and moving the tubular member,*

*said cylinder on one side of the piston adapted to be in communication with a fluid control passageway, and said cylinder on the second side of the piston adapted to be in communication with a biasing fluid,*

*first and second metal valve seats on one of the piston and cylinder, and first and second valve elements which coact with the first and second seats, respectively, said valve elements being on the other of the piston and cylinder, and*

*said first seat and first valve element positioned to shut off flow from the fluid control passageway to the cylinder when the safety valve is in one of said open and closed positions, and said second seat and second valve element positioned to shut off flow of the biasing fluid to the cylinder when the safety valve is in the other of said open and closed positions.*

* * * * *

UNITED STATES PATENT OFFICE

CERTIFICATE OF CORRECTION

Patent No. Re. 32,390 Dated April 7, 1987

Inventor(s) Ronald E. Pringle

It is certified that error appears in the above-identified patent and that said Letters Patent are hereby corrected as shown below:

Column 8, line 45, after "second" insert -- metal --

Signed and Sealed this

Eighth Day of September, 1987

*Attest:*

*Attesting Officer*

DONALD J. QUIGG

*Commissioner of Patents and Trademarks*